Feb. 20, 1951        H. KEARNS        2,542,144
BLIND RIVET
Filed Jan. 1, 1945
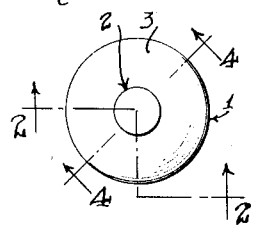
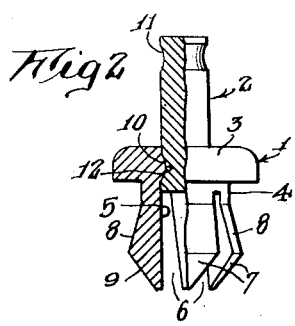
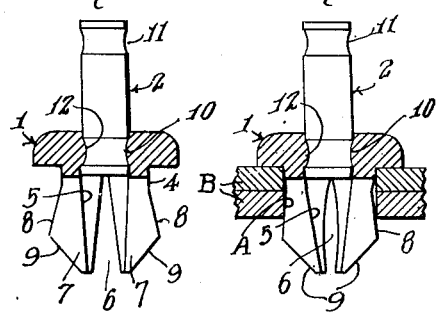
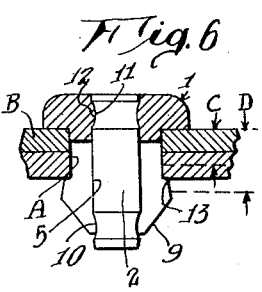
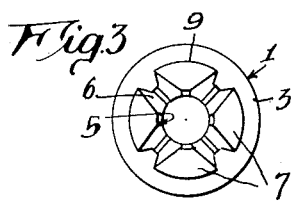
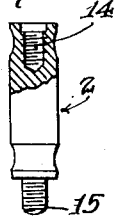
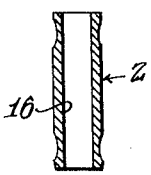
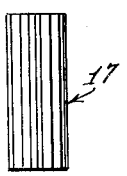
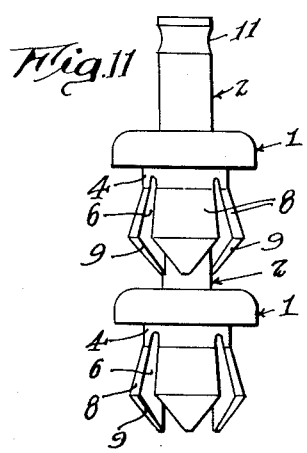
INVENTOR.
Henry Kearns
BY
Lyon & Lyon
ATTORNEYS Patented Feb. 20, 1951

2,542,144

UNITED STATES PATENT OFFICE 2,542,144

BLIND RIVET

Henry Kearns, Pasadena, Calif., assignor, by mesne assignments, to Shellmar Products Corporation, Mount Vernon, Ohio, a corporation of Delaware Application January 1, 1945, Serial No. 570,897

3 Claims. (Cl. 85—40)

My invention relates to rivets or similar rivet-like securing devices, and among the objects of my invention are:

First, to provide a rivet which is particularly suited for "blind" riveting operations, that is, under conditions wherein only one side of the material which is to be riveted is accessible.

Second, to provide a rivet wherein a rivet body having expansible gripping securing fingers and a metal expander pin are molded as a single unit, the expander pin remaining in an extended position free of the expansible fingers from the time of manufacture until the rivet is applied in the workpiece which it is intended to secure.

Third, to provide a rivet of this character wherein the expander pin may be made of metal, whereas the remainder of the rivet may be molded of plastic, the pin being incorporated as an insert during the molding operation.

Fourth, to provide a rivet of this character wherein the rivet body may serve as an insulating bushing for the metal pin, and the metal pin may be provided with threaded stems or sockets for electrical or mechanical connection to other devices.

Fifth, to provide a rivet of this character, which may be readily stacked in telescoping end-to-end relation, thereby facilitating their use in automatic feeding riveting devices.

With the above and other objects in view as will appear hereinafter, reference is directed to the accompanying drawings, in which:

Fig. 1 is a plan view of my rivet.

Fig. 2 is a partial sectional, partial elevational view thereof taken through 2—2 of Fig. 1.

Fig. 3 is a bottom view of my rivet.

Fig. 4 is a sectional view of my rivet, taken through 4—4 of Fig. 1.

Fig. 5 is a sectional view similar to Fig. 4, showing the manner in which the gripping fingers contract to enable insertion of the rivet in a plate to be riveted.

Fig. 6 is a sectional view showing the rivet secured in position and indicating by dotted lines the range of plate thickness which may be secured by a single size of rivet.

Fig. 7 is a partial sectional, partial elevational view of a modified form of expander pin provided with a threaded socket and threaded stem.

Fig. 8 is a sectional view of an expander pin which is tubular in form.

Figs. 9 and 10 are elevational and end views, respectively, of a further modified form of expander pin, wherein the pin is fluted.

Fig. 11 is an elevational view of a pair of rivets shown stacked in telescoping relation.

My rivet comprises essentially a rivet body 1 preferably molded of plastic material, and an expander pin 2 preferably of metal, and molded as an insert in the rivet body.

The rivet body is provided with a head 3 which may take any of the forms of the conventional rivet. From the head 3 extends a tubular stem 4 having a bore 5. The stem 4 is provided with axial slots 6. In the present instance, a pair of right-angularly intersecting slots are shown, which divide the stem into four expansible fingers 7.

The stem has a short cylindrical portion, and is thereupon conically enlarged to form conical gripping portions 8. The extremity of the stem is beveled to form conical entering or guiding portions 9; the gripping portions 8 and the conical portions 9 thus converge in opposite directions.

The expander pin 2 is for the most part uniform in diameter and equal to the normal diameter of the bore 5 of the stem 4. The pin 2 is provided near its ends with shallow recesses 10 and 11. The expander pin is molded in the head 3 in axial alignment with the bore 5 and extending therein axially slightly in excess of the recess 10, so that the recess 10 causes the formation of a complementary internal rib 12 in the head 3.

The material from which the rivet is molded is preferably a plastic, which is tough and relatively resilient so that it tends to return to its shape after deformation. For example, "nylon" has been found to be a suitable plastic, although many other plastics are equally suitable.

The rivet is employed as follows: The stem 4 is inserted in a hole A of proper size, formed in the material B to be secured. Upon inserting the stem, the expansible fingers 7 are constricted inwardly, this constriction being aided by the conical entering portions 9. When in position, the fingers bear against the margins of the hole A and are in inwardly deflected positions, so that the bore 5 in the stem is no longer cylindrical, but instead, is substantially conical. The expander pin 2 is then driven by either an impact or pushing force into the stem, that is, the pin moves from the position shown in Fig. 5, to the position shown in Fig. 6. In so moving, the interface between the pin and the head 3 is sheared. The internal rib 12, however, is not destroyed, but instead, is displaced outwardly to accommodate the pin 2 as it moves into its inner position, and upon alignment of the upper or initially outer recess 11 in the pin 2, the rib 12 returns to its normal form and forms an interlocking connection with the pin. When the expander pin is driven into the position shown in Fig. 6, the fingers 7 are forced outwardly, causing the conical gripping portions 8 to deform into conformity with the margins of the hole A so as to form a second head 13.

It should be noted that the thickness of the material B which may be secured by a rivet of given size, may vary between the minimum thickness C indicated in Fig. 6 and the maximum thickness D also indicated in Fig. 6.

It will also be noted that it is unnecessary to have access to the back side of the material in which the rivet is placed, that is, the rivet is particularly suitable for "blind" riveting operations.

The expander pin 2 may take several forms. Inasmuch as the expander pin 2 is formed of metal and the rivet body is formed of plastic, the rivet body serves as an insulation ring or grommet about the expander pin. Thus the expander pin may be provided with threaded sockets 14 or threaded stems 15, or both, as shown in Fig. 7, so that electrical or mechanical connections may be made therethrough. Also, in some instances, it is desired that an opening be maintained through the rivet, in which case the expander pin may have a bore 16 therethrough as shown in Fig. 8.

Also, the expander pin may take the form of a fluted cylinder 17 as shown in Figs. 9 and 10, the flutes thus provided increasing the surface contact between the expander pin and the rivet body, and thus increasing the frictional grip therebetween.

By reason of the fact that the expander pin 2 approximates the normal diameter of the bore 5 in the stems 4, the rivets are inherently capable of being stacked in telescoping relation as shown in Fig. 11. Such a stacking of the rivets greatly facilitates handling of the rivets during assembly, whether inserted in the material to be riveted manually, or by automatic machinery.

Many other embodiments of the invention may be resorted to without departing from the spirit of the invention.

I claim:

1. A securing device comprising a tubular body member of resilient non-metallic plastic provided with an enlarged portion forming a head at one end and a stem portion extending therefrom which is split axially to form a plurality of radial expansible gripping fingers cooperating with said head, a metal expander pin having one end initially molded in said head in axial alignment with the bore of said stem portion, the connection between said pin and said head being shearable whereby said pin may be driven axially into said stem to expand said fingers, said pin being provided with smooth shallow recesses on the exterior surface near each extremity thereof, one of said recesses being initially embraced within the molded connection between said pin and said head with portions of said head forming a complementary rib in said recess, said rib being adapted to be expanded when said pin is driven into said stem and then enter the other one of said recesses in said pin.

2. A securing device comprising a tubular body member of molded deformable non-metallic plastic provided with a head and a stem which is axially split to form a plurality of radially contractible gripping fingers cooperating with said head, a metal expander pin having a portion of one end initially molded in said head in axial alignment with the bore of said stem and having the remainder thereof extending in a direction opposite to said stem, the molded connection between said pin and said head being shearable when said pin is driven into said stem, a pair of axially spaced interlocking formations on said pin and a complementary interlocking formation in said head, the interlocking formation in said head initially engaging one of said interlocking formations on said pin, the plastic material of said head being yieldable whereby upon shearing of the initial connection between said pin and said head and by movement of said pin into said stem into finger expanding position the interlocking formation in said head is moved into engagement with the other one of said interlocking formations on said pin.

3. A fastener comprising a molded non-metallic plastic body portion having a generally uniform axial bore and provided with a head portion and a slotted stem forming a plurality of radially contractible deformable gripping fingers, the outer surface of said fingers sloping outwardly toward the free ends of the same and said fingers being movable toward each other for insertion into an aperture and a metal driving pin having one end molded in said head, said driving pin having a pair of annular grooves spaced axially thereon, and said head having an integral internal rib initially in yieldable interlocking engagement with one of said grooves whereby when said pin is driven into said bore to expand said fingers said rib will yield and said grooves will be displaced to bring said rib into interlocking engagement with the other one of said pair of grooves.

HENRY KEARNS.

REFERENCES CITED

The following references are of record in the file of this patent:

UNITED STATES PATENTS

| Number | Name | Date |
|---|---|---|
| 586,770 | Kempshall | July 20, 1897 |
| 1,122,280 | Kempshall | Dec. 29, 1914 |
| 1,300,580 | Carr | Apr. 15, 1919 |
| 1,808,318 | Pleister | June 2, 1931 |
| 1,940,307 | Keeler | Dec. 19, 1933 |
| 1,944,513 | Johnson | Jan. 23, 1934 |
| 1,974,160 | Peirson | Sept. 18, 1934 |
| 1,977,876 | Groff | Oct. 23, 1934 |
| 1,986,374 | Shippy | Jan. 1, 1935 |
| 2,194,458 | Eckler | Mar. 26, 1940 |
| 2,246,888 | Messenger | June 24, 1941 |
| 2,301,244 | Bishop | Nov. 10, 1942 |
| 2,302,590 | Waite | Nov. 17, 1942 |
| 2,318,415 | Patzschke | May 4, 1943 |
| 2,343,983 | Knowlton | Mar. 14, 1944 |
| 2,371,423 | Buchet | Mar. 13, 1945 |
| 2,371,452 | Lees | Mar. 13, 1945 |
| 2,393,606 | Brush | Jan. 29, 1946 |
| 2,402,287 | Kearns | June 18, 1946 |

FOREIGN PATENTS

| Number | Country | Date |
|---|---|---|
| 406,126 | Great Britain | Feb. 22, 1934 |